(12) United States Patent
Nakagawa et al.

(10) Patent No.: US 8,049,382 B2
(45) Date of Patent: Nov. 1, 2011

(54) BRUSHLESS MOTOR

(75) Inventors: Yukinori Nakagawa, Fukui (JP); Yuichi Yoshikawa, Osaka (JP); Hu Li, Osaka (JP); Masahiko Morisaki, Fukui (JP); Yoshio Kobayashi, Fukui (JP)

(73) Assignee: Panasonic Corporation, Osaka (JP)

( * ) Notice: Subject to any disclaimer, the term of this patent is extended or adjusted under 35 U.S.C. 154(b) by 178 days.

(21) Appl. No.: 12/299,947

(22) PCT Filed: Apr. 25, 2007

(86) PCT No.: PCT/JP2007/058930
§ 371 (c)(1),
(2), (4) Date: Aug. 12, 2009

(87) PCT Pub. No.: WO2007/129575
PCT Pub. Date: Nov. 15, 2007

(65) Prior Publication Data
US 2009/0302719 A1 Dec. 10, 2009

(30) Foreign Application Priority Data
May 8, 2006 (JP) .................. 2006-128810

(51) Int. Cl.
*H02K 11/00* (2006.01)
(52) U.S. Cl. .................................... 310/68 B
(58) Field of Classification Search ........ 310/667 R, 310/8 B, 68 R, 112–114, 156.17, 156.24
See application file for complete search history.

(56) References Cited

U.S. PATENT DOCUMENTS

| 4,731,554 | A | * | 3/1988 | Hall et al. .................. 310/67 R |
| 5,382,853 | A | * | 1/1995 | von der Heide et al. ..... 310/67 R |
| 6,998,757 | B2 | * | 2/2006 | Seguchi et al. ............... 310/266 |
| 7,518,273 | B2 | * | 4/2009 | Kataoka et al. .............. 310/68 B |
| 7,701,107 | B2 | * | 4/2010 | Sagara et al. .......... 310/216.079 |
| 2004/0061470 | A1 | * | 4/2004 | Ito et al. ........................ 318/565 |

FOREIGN PATENT DOCUMENTS

| JP | 56-121360 A | 9/1981 |
| JP | 59-096858 A | 6/1984 |
| JP | 02184251 A * | 7/1990 |
| JP | 06-276720 A | 9/1994 |
| JP | 6-276720 A | 9/1994 |
| JP | 10-174407 A | 6/1998 |
| JP | 10-174407 A | 6/1998 |
| JP | 10-271782 A | 10/1998 |
| JP | 10-271782 A | 10/1998 |
| JP | 2004-064850 A | 2/2004 |
| JP | 2004-120933 A | 4/2004 |
| JP | 2004-120933 A | 4/2004 |
| JP | 2005-110403 A | 4/2005 |
| JP | 2006-014521 A | 1/2006 |

OTHER PUBLICATIONS

International Search Report for International Application No. PCT/JP2007/058930, filed Jul. 17, 2007, Panasonic Corportation.
JP Office Action for 2008-514431, filed May 24, 2011.

* cited by examiner

*Primary Examiner* — Tran Nguyen
(74) *Attorney, Agent, or Firm* — RatnerPrestia

(57) ABSTRACT

A Hall element is placed under an outside rotor at an identical angular position to a centerline between two adjacent outer teeth. This structure allows narrowing a dead band of the Hall element when it senses a leakage magnetic flux.

5 Claims, 4 Drawing Sheets

BRUSHLESS MOTOR

This application is a U.S. National Phase Application of PCT International Application PCT/JP2007/058930.

TECHNICAL FIELD

The present invention relates to a brushless motor, and more particularly, it relates to a magnetism sensing device which magnetically senses a position of a rotor.

BACKGROUND ART

FIG. 7 shows a conventional brushless motor which includes stator 110, rotor 120 and Hall elements 130 working as a magnetism sensing device. Stator 110 includes multiple coils 115 wound on teeth 113 of a stator iron core. Each one of coils 115 is coupled together, thereby forming a three-phase stator winding. Rotor 120 includes rotor iron-core 121 and multiple rotor-magnets 123. Rotor 120 is held to be rotatable inside stator 110.

Hall element 130 is placed under rotor-magnet 123 substantially at an identical angular position to a centerline of teeth 113. Hall element 130 senses a magnetic flux leaking from rotor-magnet 123, thereby sensing a position of the rotor.

FIG. 8 shows an array of rotor-magnets 123 and its leakage flux working on Hall elements 130. The reference marks "Bop" and "Brp" shown in FIG. 8 indicate threshold values for Hall elements 130 to sense the leakage flux, and widths "a" and "b" show dead bands existing when Hall elements 130 senses the leakage flux. A greater dead band causes Hall elements 130 to sense the rotor position not so accurately, and incurs vibration and noise of the motor. A smaller dead band is thus desirable for the magnetism sensing device of brushless motors.

Related art of the magnetism sensing device of brushless motors is disclosed in patent document 1.
Patent Document 1: Unexamined Japanese Patent Application Publication No. 2006-14521.

DISCLOSURE OF INVENTION

A brushless motor of the present invention includes the following elements:
- a stator including:
  - a stator core having:
    - an annular yoke;
    - outer teeth projecting outward from the annular yoke;
    - inner teeth projecting inward from the annular yoke;
  - a stator winding wound on the stator core;
- a rotor including:
  - an inside rotor confronting the inner teeth and having rotor-magnets;
  - an outside rotor confronting the outer teeth and having rotor-magnets; and
- a magnetism sensing device sensing a leakage magnetic flux leaking from the rotor magnets of the outside rotor, and placed at an identical angular position to a centerline between two adjacent outer teeth.

The foregoing structure allows the brushless motor to narrow the dead bands of sensing of the leakage magnetic flux, so that the vibration and noise of the motor can be reduced.

Figure 1:
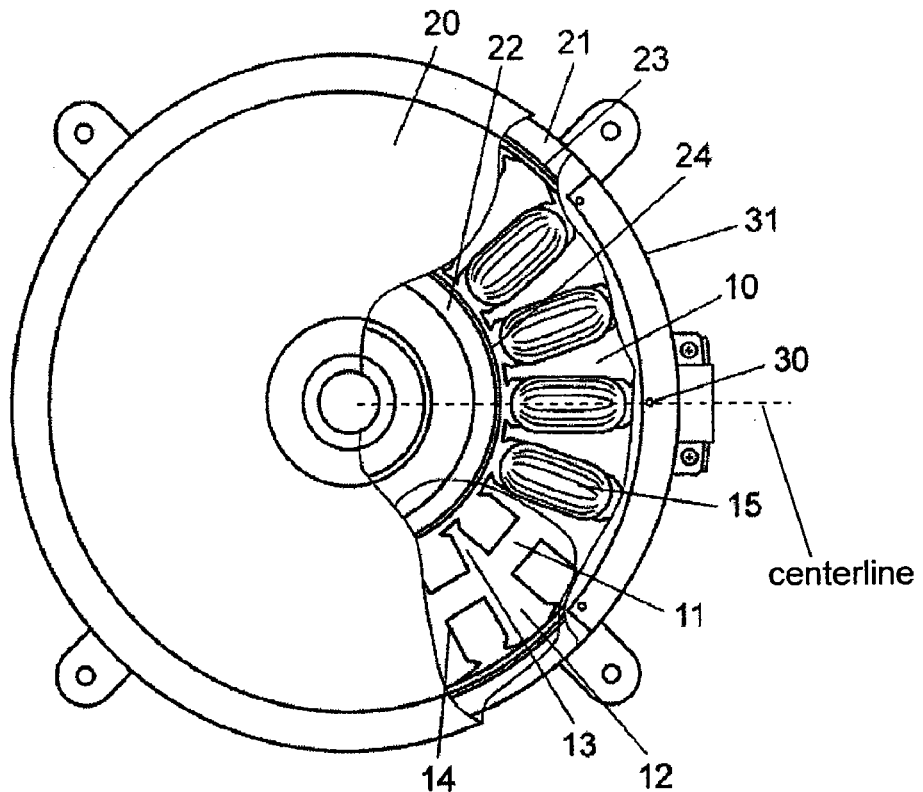
FIG. 1 shows a motor in accordance with an embodiment of the present invention.

DESCRIPTION OF REFERENCE MARKS 10 stator
11 yoke
12 outer teeth
13 inner teeth
14 stator core
15 stator winding (toroidal coil)
20 rotor
21 outside rotor
22 inside rotor
23 rotor magnet
30 magnetism sensing device (Hall element)
35 rotor core

PREFERRED EMBODIMENT OF THE INVENTION

An exemplary embodiment of the present invention is demonstrated with reference to the accompanying drawings. FIG. 1 shows a brushless motor in accordance with the embodiment. The brushless motor includes stator 10, rotor 20, and Hall elements 30 working as magnetism sensing devices. Stator 10 has stator core 14 and multiple toroidal coils 15, i.e. stator windings. Stator core 14 is formed of annular yoke 11, outer teeth 12 projecting outward from yoke 11 and inner teeth 13 projecting inward from yoke 11. Outer teeth 12 are available in the same number as inner teeth 13, and placed at the same angle as inner teeth 13 in terms of angular positions.

Multiple toroidal coils 15 are wound on yoke 11, and they are coupled to each other for forming a three-phase stator winding.

Rotor 20 is held to be rotatable with respect to stator 10, and includes outside rotor 21 confronting outer teeth 12 and inside rotor 22 confronting inner teeth 13. Rotor magnets 23 are placed on the inner wall of outside rotor 21, and rotor magnets 24 are placed on the outer wall of inside rotor 22. Rotor magnets 23 and 24 are placed such that the magnetic fluxes of outside rotor 21 and inside rotor 22 can be distributed at the same angle. It is thus not necessarily to sense the leakage magnetic flux leaking from both of rotors 21 and 22, but it is enough to sense the leakage flux from either one of outside rotor 21 or inside rotor 22 for sensing a position of the rotor. In this embodiment, Hall elements 30 sense the leakage magnetic flux leaking from outside rotor 21.

Hall element 30 is mounted to wired board 31, and placed under rotor magnet 23 substantially at an identical angular position to a centerline between two adjacent outer teeth 12.

Figure 2:
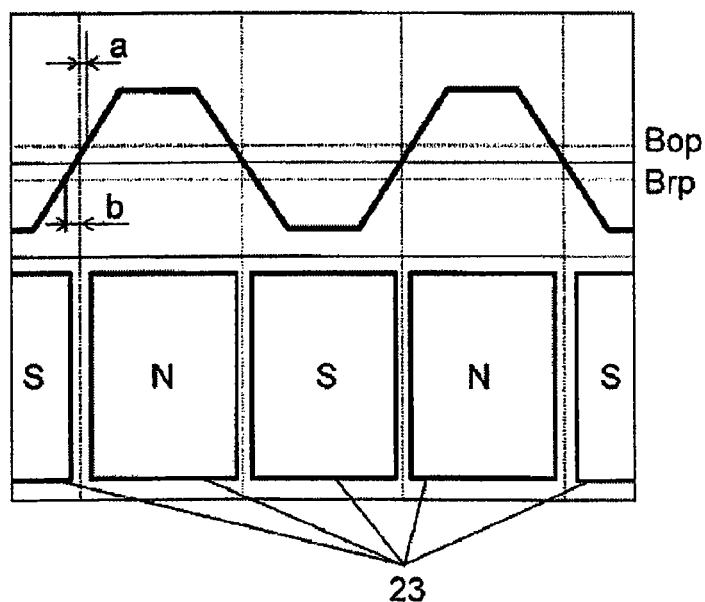
FIG. 2 shows an array of rotor-magnets and leakage magnetic flux leaking from the rotor-magnets.

FIG. 2 shows an array of rotor magnets 23 of outside rotor 21 and its leakage magnetic flux working on Hall elements 30 of rotor magnets 23. The reference marks "Bop" and "Brp" shown in FIG. 2 indicate threshold values for Hall elements 30 to sense the leakage flux, and widths "a" and "b" show dead bands occurring when Hall elements 30 sense the leakage flux.

Figure 8:
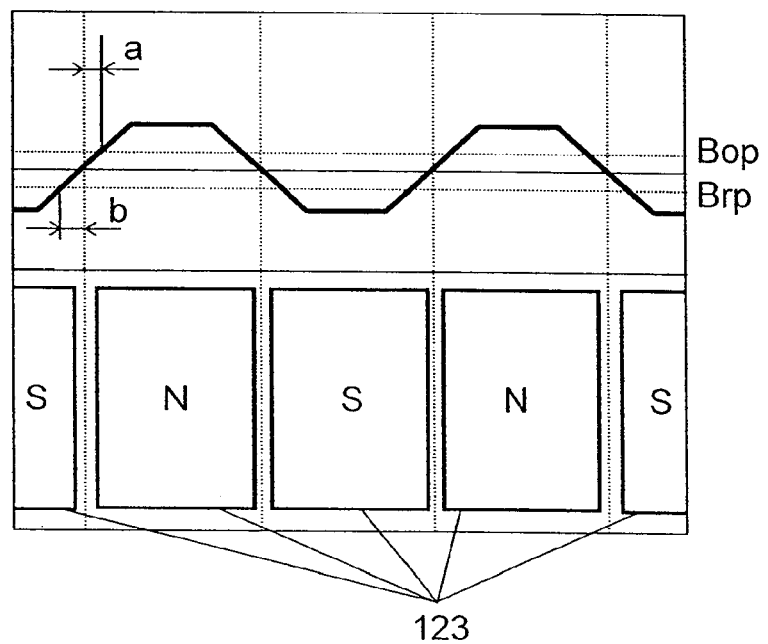
FIG. 8 shows rotor-magnets and magnetic fluxes leaking from the rotor-magnets of the conventional motor.

A comparison of FIG. 2 with FIG. 8 tells that FIG. 2 shows narrower dead bands than those shown in FIG. 8. In other words, a placement of one of Hall element 30 at the center of two adjacent teeth narrows the dead band, so that the vibration and noise of the motor can be reduced.

Improvements of outside rotor 21 for narrowing dead bands "a" and "b" are demonstrated hereinafter.

First Instance of Improvement

Figure 3:
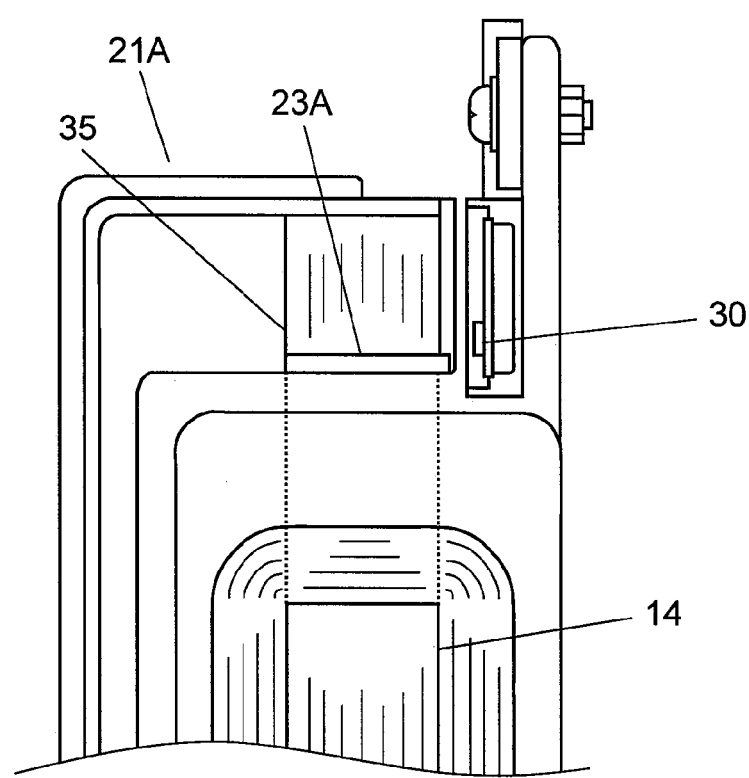
FIG. 3 shows a sectional view in part of a first instance of improvement of an outside rotor.

FIG. 3 shows a sectional view in part of outside rotor 21A. Rotor magnet 23A is longer than rotor core 35 in axial direction toward Hall element 30. This structure allows reducing a distance between rotor magnet 23A and Hall element 30, so that a greater amount of the leakage magnetic flux from magnet 23A can work on Hall element 30. As a result, the dead bands can be reduced.

Second Instance of Improvement

Figure 4:
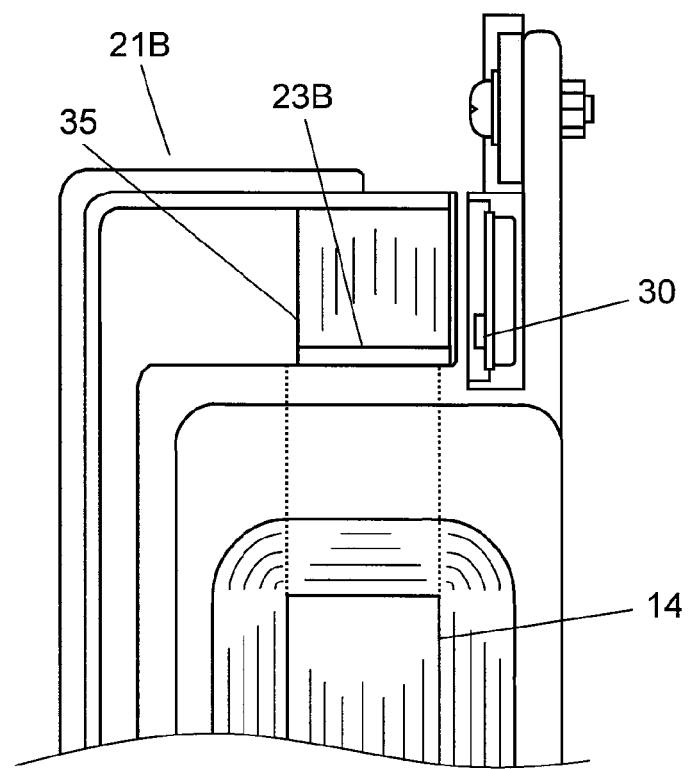
FIG. 4 shows a sectional view in part of a second instance of improvement of the outside rotor.

FIG. 4 shows a sectional view in part of outside rotor 21B. Rotor core 35, rotor magnet 23B, and stator core 14 have the same axial length with each other. Rotor core 35 and rotor magnet 23B are shifted toward Hall element 30 from the position of stator core 14. This structure allows reducing a distance between rotor magnet 23B and Hall element 30, so that a greater amount of the leakage magnetic flux from magnet 23B can work on Hall element 30. As a result, the dead bands can be reduced.

Third Instance of Improvement

Figure 5:
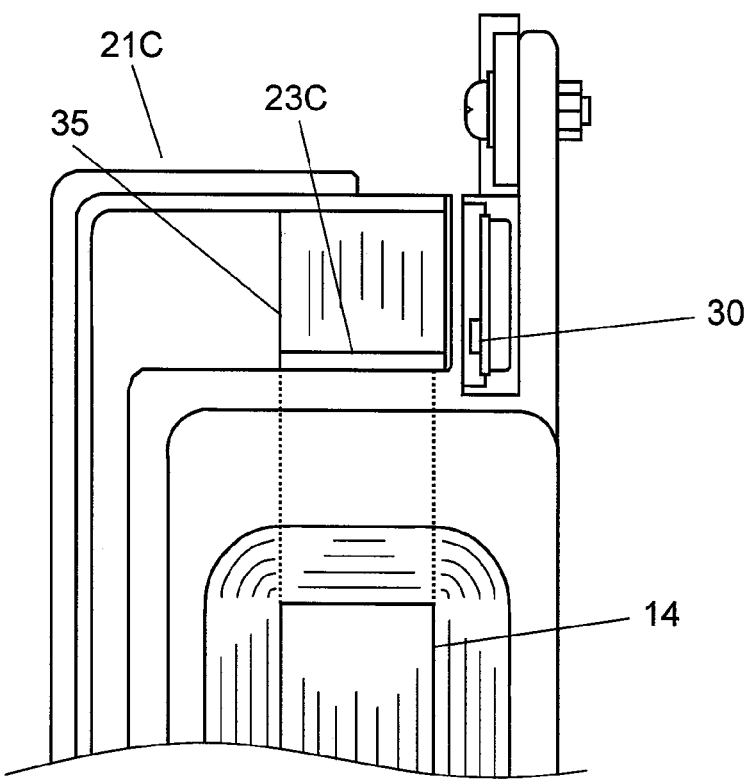
FIG. 5 shows a sectional view in part of a third instance of improvement of the outside rotor.

FIG. 5 shows a sectional view in part of outside rotor 21C. Rotor core 35 and rotor magnet 23C are longer than stator core 14 toward Hall element 30. This structure allows reducing a distance between rotor magnet 23C and Hall element 30, so that a greater amount of the leakage magnetic flux from magnet 23C can work on Hall element 30. As a result, the dead bands can be reduced.

Figure 6:
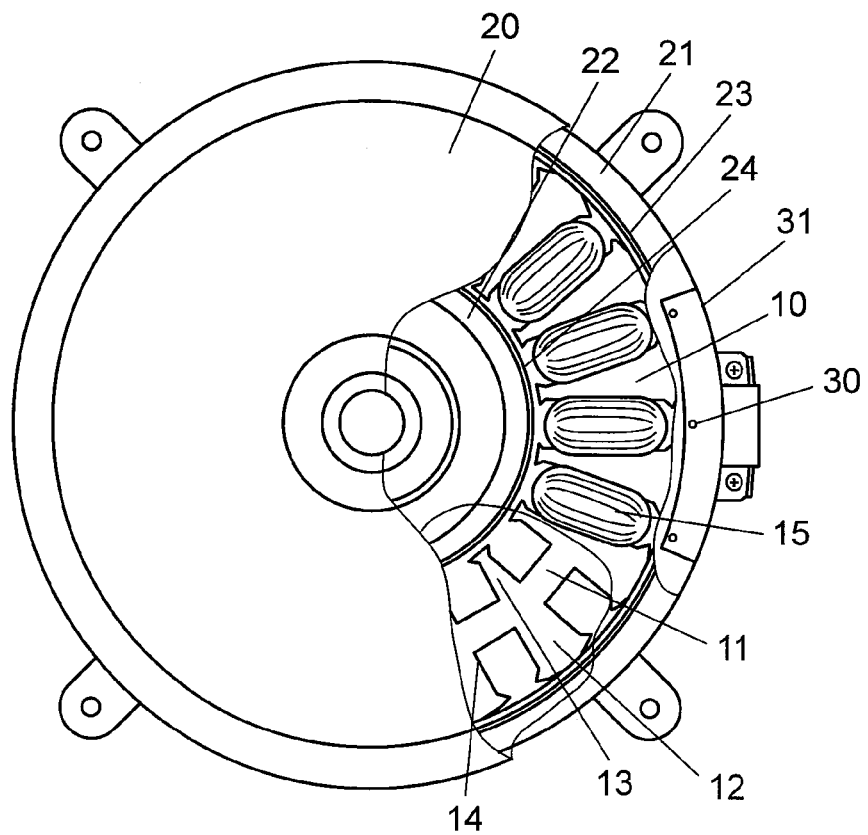
FIG. 6 shows a motor which employ Hall elements arranged in a shortened span.
Figure 7:
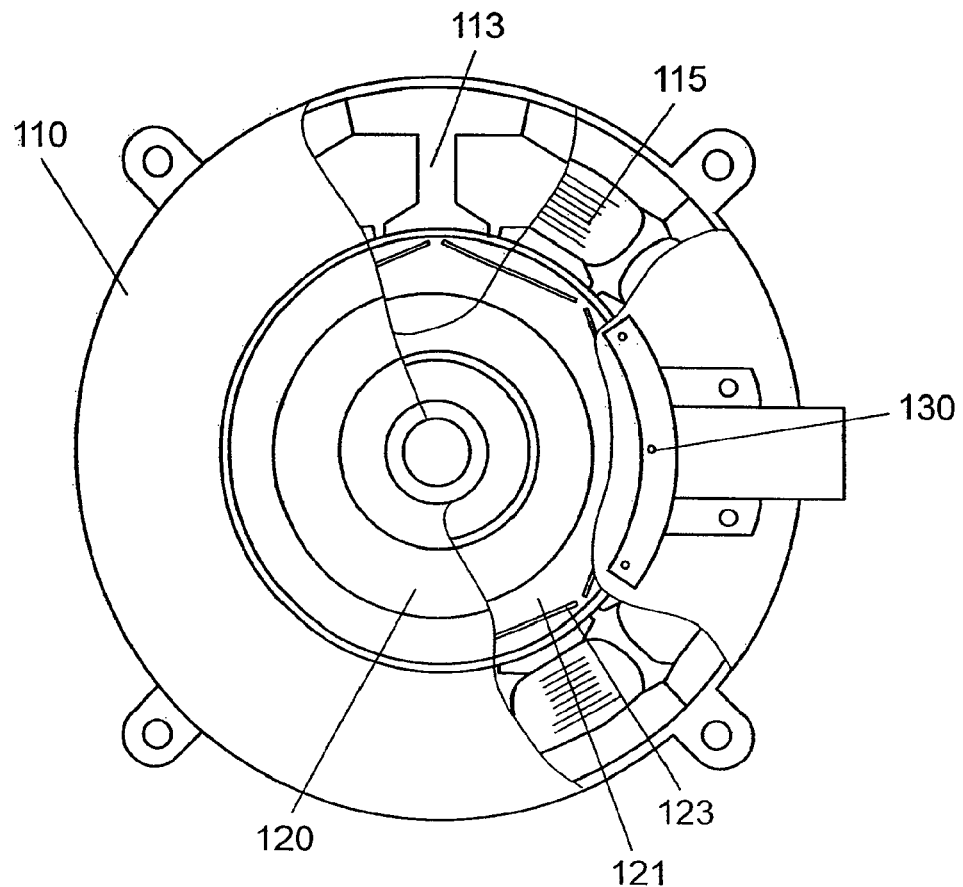
FIG. 7 shows a conventional motor.

At least one of the multiple magnetism sensing devices is reversed its polarity, and this reversal allows shortening a span between two adjacent magnetism devices as shown in FIG. 6. This is a feature of the present invention.

In this embodiment, the magnetism sensing devices are placed such that they sense the leakage magnetic flux from the rotor magnets of the outside rotor, however, the magnetism sensing devices can be placed such that they sense the leakage magnetic flux from either one of the outside rotor or the inside rotor.

INDUSTRIAL APPLICABILITY

A brushless motor of the present invention is useful for applications which need lower vibrations as well as lower noises.

The invention claimed is:

1. A brushless motor comprising:
    a stator including:
        a stator core having:
            an annular yoke;
            outer teeth projecting outward from the annular yoke;
            inner teeth projecting inward from the annular yoke; and
        a stator winding wound on the stator core;
    a rotor including:
        an inside rotor confronting the inner teeth and having a rotor-magnet;
        an outside rotor confronting the outer teeth and having a rotor-magnet; and
    a magnetism sensing device sensing a leakage magnetic flux leaking from the rotor magnet of the outside rotor, and placed at an identical angular position to a centerline between two adjacent outer teeth,
    wherein an axial distance between the rotor-magnet of the outside rotor and the magnetism sensing device is less than an axial distance between a rotor core of the outside rotor and the magnetism sensing device or an axial distance between the stator core and the magnetism sensing device.

2. The brushless motor of claim 1, wherein an axial length of the rotor magnet of the outside rotor is longer than an axial length of the rotor core of the outside rotor toward the magnetism sensing device.

3. The brushless motor of claim 1, wherein a rotor core of the outside rotor, the rotor magnet of the outside rotor, and the stator core have an axial length identical to each other, and a center along an axial direction of the rotor core of the outside rotor is shifted from a center along an axial direction of the stator core toward the magnetism sensing device.

4. The brushless motor of claim 1, wherein a rotor core of the outside rotor and the rotor magnet of the outside rotor have an axial length identical to each other, and the axial length of the rotor magnet of the outside rotor is longer than an axial length of the stator core toward the magnetism sensing device.

5. The brushless motor of claim 1, wherein at least one of a plurality of the magnetism sensing devices has a polarity reverse to those of the other magnetism sensing devices.

\* \* \* \* \*